Sept. 14, 1954  G. P. LOOMIS  2,688,996
METHOD OF BUILDING TIRE CASINGS
Filed April 18, 1951
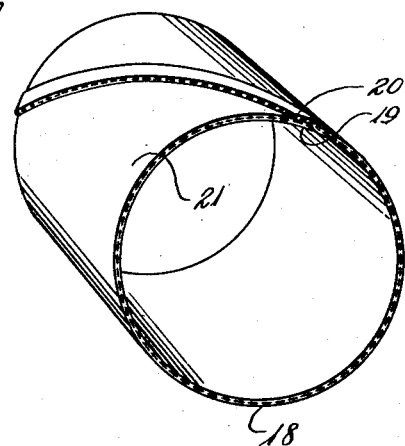
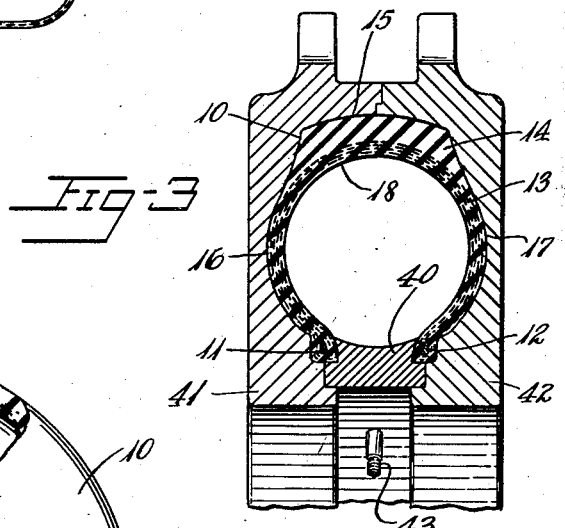
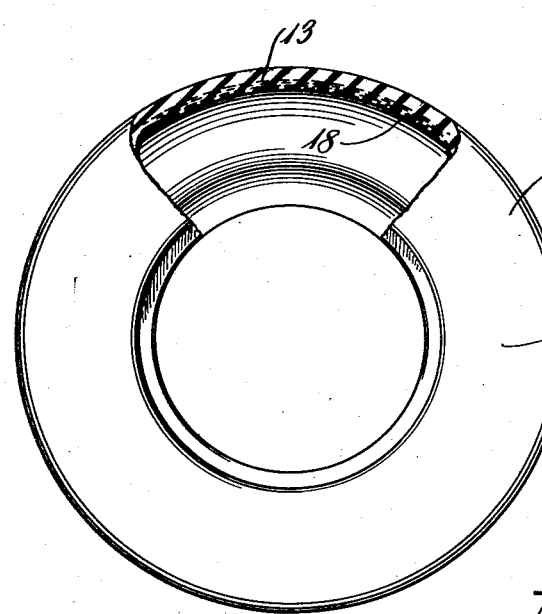
Inventor
George P. Loomis Patented Sept. 14, 1954

2,688,996

UNITED STATES PATENT OFFICE 2,688,996

METHOD OF BUILDING TIRE CASINGS

George P. Loomis, Silver Lake, Ohio, assignor to
The B. F. Goodrich Company, New York, N. Y.,
a corporation of New York Application April 18, 1951, Serial No. 221,581

1 Claim. (Cl. 154—14)

This invention relates to the building of tire casings and is particularly useful in the building of casings to be vulcanized without the use of curing bags although the invention may also be employed in the building of other tire articles.

In the manufacture of tire casings as it has been commonly practiced, successive plies of rubberized cord or fabric have been assembled about a collapsible drum having a relatively flat face. After a number of plies of the body material have been rolled into contact with the shoulders of the building drum, bead reinforcements have been placed thereupon and then the remaining plies of textile material and the rubber tread have been assembled over the bead reinforcements. The tire casing has then been removed by collapsing the building drum, the tire has been formed by expanding the material thereof between the bead portions, a curing bag has been inserted within the cavity of the casing and the assembled casing and curing bag have been placed between heated mold members where the curing bag has been inflated to press the casing against the mold and the tire has been vulcanized.

It has been proposed to eliminate the curing bag and to vulcanize the tire casing in a mold while pressing the casing against the mold by fluid pressure introduced into the annular cavity of the tire casing in direct contact with the interior of the casing. Such a method has presented difficulties and while it has been found possible to seal off the bead portions of the tire casing at the mold and to prevent entrance of the pressure fluid between the cords of the casing by the use of an inner layer of impervious material, the resulting tire casing has been found to have ridges on its inner surface where the coated cord material of the innermost layer has been spliced. Such ridges on the inner surface of the tire casing are detrimental to the life of an inner tube placed in the casing in contact therewith as the ridges locally abrade the surface of the tube and cause it to leak.

It is an object of the present invention to overcome the foregoing and other difficulties. A further object is to provide a tire having a smooth inner face vulcanized by direct engagement with the pressure fluid.

Other objects are to provide an improved inner layer for the tire casing, to eliminate leaks at the seams of the inner layer, and to facilitate construction of the casing. These and other objects will appear from the following description and the accompanying drawings.

Of the drawings,

Fig. 1 is a perspective view of the inner ply of the tire casing formed as a band ply.

Fig. 2 is a perspective view thereof illustrating the treatment of a seam thereof in accordance with the invention.

Fig. 3 is a cross-sectional view of the casing mounted in a vulcanizing mold.

Fig. 4 is a side view of the vulcanized casing with a portion thereof shown broken away and in section.

Referring to the drawings which illustrate an embodiment of the invention, the tire casing 10 comprises a pair of annular bead reinforcements 11, 12, a plurality of plies 13 of cords or other tension-resisting flexible material extending about the interior of the casing and anchored to the bead reinforcements, and a cover 14 of rubber material extending about the cord material and bonded thereto by vulcanization, the cover providing a tread 15 and sidewall portion 16, 17. The innermost ply 18 is formed as a band ply. That is, a flat band of bias laid cord material having a coating 21 thereon of relatively impervious unvulcanized rubber material such as butyl rubber is laid about a cylindrical surface (not shown) and its diagonally cut ends 19, 20 are seamed together, either by a lapped or butted splice, preferably the latter, to provide an endless band. The band splice may be in uncured, semi-cured or fully cured condition, depending upon the construction of tire desired although the semi-cured or fully cured material is preferred as this has higher resistance to penetration of the fluid used in providing the pressure within the tire.

In splicing the band ply, the rubber coated cord material is either butted or lapped and subjected to pressure at the seam to provide a thickness at the seam no greater than that of a single ply. Where the material is lapped, the lap is preferably no greater than the width of two adjacent cords and in applying pressure, the overlapped cords are forced into intercalated relation. A strip of gum may be laid along the splice if desired especially where the material is butt spliced to provide for filling any space between the cords at the splice.

To avoid the presence of ridges or shoulders on the inner face of the band ply, and to insure that the splice will be fluid tight during cure the splices in this ply are flattened by use of heat and pressure and cured to some degree before the band ply is assembled with other material. Referring to Fig. 2 of the drawing, this shows a pair of pressing clamp bars 30, 31 hinged to each other at one end as by a pin 32. At the opposite ends of the bars a pair of links 33, 34 are pivoted to bar 31 and may be swung about their pivoted connection 35. A cam clamp 36 is pivotally secured to the links at 37 in position to apply pressure to bar 30. The arrangement is such that the clamping mechanism may be swung clear of bar 30 by releasing the cam clamp, whereupon the bars 30, 31 may be separated to permit insertion therebetween of the band. The clamp bars are then aligned over the splice and the clamp is swung into place and clamped to the bars applying pressure along the splice.

The bars 30, 31 are provided with electrical resistance heating elements (not shown) connected to flexible wires 38, 39 for applying an electric current thereto. Any other heated pressing means suitable for the purpose may be employed in place of the apparatus shown.

Heat and pressure are applied to the splice for a sufficient length of time to cause a flow of the rubber material at the splice and to permit the cord at the splice to be forced into the thickness of a single ply of the materials as by pressing the cords of one margin into adjacent or intercalated relation to the cords of the other margin. The length of time that the hand splice is left between the bars depends largely on the degree of cure that is desired.

After the splices of the band have been pressed to provide splices without offset margins, the pressing means are removed from the band and the band is mounted upon the collapsible drum. This mounting may be accomplished by first collapsing the drum and then slipping the band over the drum to the desired location. The drum is then expanded to normal building position where it provides a smooth support for the band, the band embracing the drum about its circumference under slight tension.

The remaining plies of textile material, the bead reinforcements, and the rubber tread may then be applied over the band ply in the usual manner.

After the materials of the tire casing have been assembled, the drum is collapsed and the casing removed therefrom. The casing may then be formed to shape and mounted in the vulcanizing mold as shown in Fig. 3. In the mold, a sealing or bull ring 40 is placed between the bead portions of the tire casing and these are clamped and sealed against the ring 40 by the mold members 41, 42. The ring 40 is provided with an inflation stem or valve 43 whereby the tire cavity may be filled with fluid under pressure to apply pressure to the tire casing during the cure. The resulting tire casing is smooth on its interior surface and free from ridges so as to present a smooth surface to an inner tube in contact therewith.

Variations may be made without departing from the scope of the invention as it is defined by the following claim:

I claim:

The method of building a tire casing of rubber and textile material which comprises the steps of bringing together the longitudinally extending cords disposed at opposite ends of a bias cut ply formed of parallel cords disposed in a layer of unvulcanized rubber, overlapping said end cords so that the overlapped cords are in between one another, applying pressure along the overlapped cords to force the latter into the same plane and to form an irregular juncture between the two layers of rubber, applying heat to the seam thus formed so as to unite the layers of rubber and partially cure the rubber, assembling other materials about the outer face of the ply to provide a tire carcass, placing the unvulcanized carcass in a mold with its internal face free from mold contact, conforming the carcass to the mold by applying fluid pressure to its internal face, and vulcanizing the carcass while it is so held under pressure.

References Cited in the file of this patent

UNITED STATES PATENTS

| Number | Name | Date |
|---|---|---|
| 1,393,998 | Fulton | Oct. 18, 1921 |
| 1,467,289 | Eames | Sept. 4, 1923 |
| 1,899,067 | Trumbull | Feb. 28, 1933 |
| 2,476,884 | Maynard | July 19, 1949 |
| 2,497,226 | McNeill | Feb. 14, 1950 |
| 2,588,207 | Cleland et al. | Mar. 4, 1952 |